United States Patent Office 3,234,259
Patented Feb. 8, 1966

3,234,259
VINYLDIOXABORINANES
William G. Woods, Anaheim, Irving S. Bengelsdorf, Santa Ana, and Don L. Hunter, Long Beach, Calif., assignors to United States Borax & Chemical Corporation, Los Angeles, Calif., a corporation of Nevada
No Drawing. Filed Sept. 27, 1962, Ser. No. 226,743
3 Claims. (Cl. 260—462)

This invention relates to new vinylboron compounds and to a method for preparing the same. The present application is a continuation-in-part of our application bearing Serial Number 133,555, filed August 24, 1961, now abandoned.

It is the principal object of this invention to provide as new compounds the vinyldioxaborinanes.

It is a further object of the present invention to provide a novel and economical method for preparing the vinyl dioxaborinanes in a substantially pure state.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises vinyldioxaborinanes having the formula:

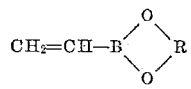

where R is an alkylene radical 3 carbon atoms in length and containing a total of from 4 to 20 carbon atoms.

The vinyldioxaborinanes of the present invention have chemical and physical properties different from any of the ethyleneboronate esters known to the art. In particular, they exhibit a remarkable stability to air oxidation, air induced polymerization and hydrolysis, and they can be stored at normal ambient conditions. For example, 2-vinyl-4,4,6-trimethyl-1,3,2-dioxaborinane has been stored at ambient conditions for periods of over 6 months in the absence of inhibitors without any polymerization or modification in its elementary or molecular composition.

There are two points concerning the chemistry of the present vinyldioxaborinanes which must be emphasized and clearly understood, since it is these two factors which contribute to these compounds chemical and physical properties never before attained by any of the ethyleneboronate esters which are known to the art. As stated in the foregoing broadly stated paragraph, the present compounds have the formula

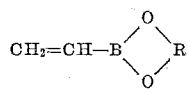

Attention is first directed to the fact that the present compounds have a terminal vinyl group and it is the full intention of the present invention to specifically exclude any compounds where there is any substitution on the vinyl group. Attention is next directed to the fact that R in the above formula is specifically defined as an alkylene radical 3 carbon atoms in length and containing a total of from 4 to 20 carbon atoms, and it is the full intention of this invention to specifically exclude those cyclic compounds where the two oxygen atoms which are bonded to the alkylene radical are separated by a polymethylene bridge.

The present vinyldioxaborinanes are of particular interest since they can be homopolymerized or inter-reacted with other vinyl comonomers to prepare a new group of interesting polymeric materials. Additionally, the vinyldioxaborinanes have many applications in organic syntheses. For example, they can be halogenated, they will form Diels-Alder adducts and will add mercaptans, and in the form of such derivatives they have utility as germicides, herbicides, insecticides and fungicides.

The present compounds are prepared by the reaction of a Grignard reagent having a terminal vinyl group with an alkyl or aryl glycol monoborate ester, the glycol portion of which is 3 carbon atoms in length and contains from 4 to 20 carbon atoms which can be selected to yield the desired vinyldioxaborinane. The reaction appears to proceed in two steps: The first step results in the formation of a complex, and in the second step the complex is pyrolyzed to the alkoxymagnesium or aryloxymagnesium halide and the desired product. The reaction can best be illustrated by the following equations:

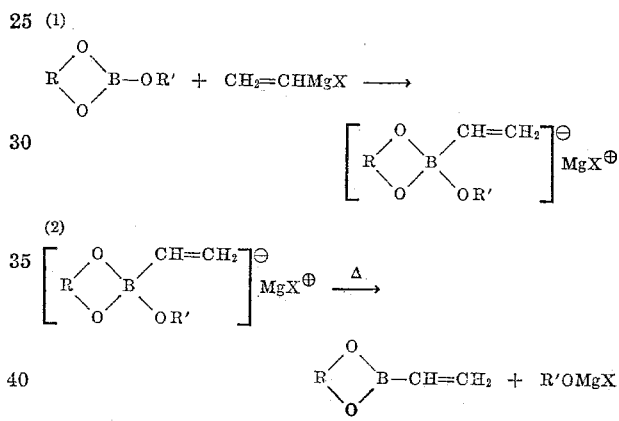

where R is an alkylene radical 3 carbon atoms in length and containing a total of from 4 to 20 carbon atoms, R' is an alkyl or aryl radical and X is either chlorine or bromine.

The reaction of the terminal vinyl Grignard reagent and the alkyl or aryl glycol monoborate ester must be carefully controlled to obtain optimum yields of the desired vinyldioxaborinanes. The reactants are added simultaneously in increments to an agitated reaction vessel containing a small amount of ether, thereby maintaining, as nearly as possible, equimolar amounts of the reactants in the reaction zone. When the Grignard reagent is vinyl magnesium chloride it is added as a solution in tetrahydrofuran, and when it is vinyl magnesium bromide it is added as a solution in ether. The alkyl or aryl glycol monoborate esters are liquids and as such are added in an undiluted state.

The yield of product is also dependent on the temperature at which the vinyl Grignard reagent and the alkyl or aryl glycol monoborate ester are reacted. The reaction will proceed and some product is recovered when the reaction is performed at temperatures as high as about 25° C. However, the yield of product is increased when the reaction temperature is lowered, and in the preferred embodiment of the invention we perform the reaction at temperatures of from about —80° C. to about —40° C.

The pyrolysis step of the process is performed after allowing the reaction mass to warm to room temperature and after removing a major portion of the ether or tetrahydrofuran from the reaction vessel. The residual reaction mass is then heated and the liquid phase is distilled and recovered, leaving behind a solid residue which is discarded. In the preferred embodiment of the invention we add an inert high boiling heat transfer medium, such as mineral oil, to the reaction mass after the ether or tetrahydrofuran has been removed to facilitate the pyrolysis and removal of the residual solid from the reaction vessel. It is to be noted here, that when a liquid is added to the reaction mass it merely acts as a convenient heat transfer medium and is not required to dissociate or react with the complex.

The distillate recovered from the pyrolysis of the complex is then fractionally distilled and the desired vinyldioxaborinane is recovered in an extremely pure state. The purity of the present compounds has been determined by gas chromatography and nuclear magnetic resonance as well as by the standard classical chemical analytical techniques. The high purity of these compounds enhances their applicability in organic syntheses and for the preparation of useful and specific polymers.

The terminal vinyl Grignard reagents, $CH_2=CHMgX$, applicable to the present invention are vinyl magnesium chloride and vinyl magnesium bromide. As previously noted the vinyl magnesium chloride is prepared as a solution in tetrahydrofuran and the vinyl magnesium bromide is prepared as a solution in ether. In the preferred embodiment of the invention we use vinyl magnesium chloride in the tetrahydrofuran.

The alkyl and aryl glycol monoborate esters applicable to the present invention have the formula:

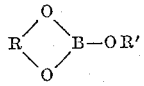

where R is an alkylene radical 3 carbon atoms in length containing a total of from 4 to 20 carbon atoms and R' is a lower alkyl radical, phenyl or a lower alkyl substituted phenyl. The following list is illustrative of such compounds:

2-n-butoxy-4,4,6-trimethyl-1,3,2-dioxaborinane
2-methoxy-4,4,6-trimethyl-1,3,2-dioxaborinane
2-n-butoxy-4-methyl-1,3,2-dioxaborinane
2-isopropoxy-5-methyl-5-propyl-1,3,2-dioxaborinane
2-pentoxy-4,5,5-trimethyl-1,3,2-dioxaborinane
2-ethoxy-4-propyl-5-ethyl-1,3,2-dioxaborinane
2-n-butoxy-5-methyl-5-ethyl-1,3,2-dioxaborinane
2-m,p-cresyloxy-4,4,6-trimethyl-1,3,2-dioxaborinane
2-phenoxy-4-methyl-1,3,2-dioxaborinane It is again noted that the foregoing alkyl and aryl glycol monoborate reactants are those compounds where the two oxygen atoms are separated by an alkylene group 3 carbon atoms in length and containing 4 to 20 carbon atoms and thus does not include any compounds where the two oxygen atoms are separated by a polymethylene bridge.

It is to be clearly understood that the foregoing list is only a partial enumeration of the alkyl and aryl glycol monoborate esters applicable as reactants for the present invention and is not intended to limit the invention.

So that the present invention is more clearly understood, the following illustrative examples are given:

I

A 500 ml. round-bottomed flask containing 75 ml. of ether was cooled to −70° C. With constant agitation, 54 ml. (0.25 mole) of 2-n-butoxy-4,4,6-trimethyl-1,3,2-dioxaborinane and 96.2 ml. (0.25 mole) of 2.60 M vinyl magnesium chloride solution in tetrahydrofuran were simultaneously added in increments to the ether over a 16-minute period. A solid precipitate formed which dissolved when the reaction mass was allowed to warm to room temperature. About one half of the tetrahydrofuran and all of the ether were then removed by distillation at atmospheric pressure. The pressure was then reduced to about 1 mm., the temperature was increased slowly to about 210° C., and a liquid distillate was recovered leaving behind a solid residue in the reaction flask. The distillate was then fractionally distilled and 30.65 grams (79.2% yield) of 2-vinyl-4,4,6-trimethyl-1,3,2-dioxaborinane, B.P. 69–70° C., at 35 mm., was recovered. Chemical analyses of the product yielded the following data:

Calculated for $C_8H_{15}BO_2$:
  C=62.38%
  H=9.8%
  B=7.02%

Found in product:
  C=62.08%
  H=9.97%
  B=7.03%

II

A two liter round-bottomed flask containing 200 ml. of ether was chilled to −70° C. With constant agitation 172 grams (1 mole) of 2-n-butoxy-4-methyl-1,3,2-dioxaborinane and 386 ml. (1 mole) of 2.59 M vinyl magnesium chloride solution in tetrahydrofuran were simultaneously added in increments to the ether over a 43-minute period. A solid precipitate formed which dissolved when the reaction mass was allowed to warm to room temperature. About one half of the tetrahydrofuran and all of the ether were then removed by distillation at atmospheric pressure. Five hundred ml. of mineral oil were added to the reaction vessel and the reaction mass was heated to about 200° C. The liquid which distilled off was recovered leaving behind a solid suspended in mineral oil in the reaction flask. The recovered distillate was fractionally distilled and 90.5 grams (71.4% yield) of 2-vinyl-4-methyl-1,3,2-dioxaborinane, B.P. 64–65° C. at 40 mm., was recovered. Chemical analyses of the product yielded the following data:

Calculated for $C_6H_{11}BO_2$:
  C=57.21%
  H=8.70%
  B=8.59%

Found in product:
  C=57.01%
  H=8.83%
  B=8.61%

III

A two liter round-bottomed flask containing 200 ml. of ether was chilled to 0° C. With constant agitation 234 grams (1 mole) of 2-m,p-cresyloxy-4,4,6-trimethyl-1,3,2-dioxaborinane and 328 ml. (1 mole) of 3.05 M vinyl magnesium chloride solution in tetrahydrofuran were added simultaneously in increments to the ether over a 50-minute period. Most of the tetrahydrofuran and all of the ether then were removed by distillation at atmospheric pressure and the reaction mass was heated to about 210° C. in vacuo. The liquid which distilled was recovered and the solid mass in the reaction flask was discarded. The pyrolysate was fractionally distilled and 74 grams (48% yield) of 2-vinyl-4,4,6-trimethyl-1,3,2-dioxaborinane was recovered.

IV

Example III was repeated except that 1 mole of 2-phenoxy-4-methyl-1,3,2-dioxaborinane was used as the glycol monoborate reactant. About a 52% yield of 2-vinyl-4-methyl-1,3,2-dioxaborinane was obtained.

Other modes of applying the principle of the invention may be employed, change being made as regards the details described, provided the features stated in any of the following claims or the equivalent of such be employed.

We, therefore, particularly point out and distinctly claim as our invention:

1. Terminal vinyldioxaborinanes having the formula

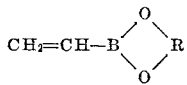

where R is an alkylene radical 3 carbon atoms in length and containing a total of from 4 to 20 carbon atoms.
2. 2-vinyl-4-methyl-1,3,2-dioxaborinane.
3. 2-vinyl-4,4,6-trimethyl-1,3,2-dioxaborinane.

References Cited by the Examiner

UNITED STATES PATENTS 2,889,352  6/1959  Tully _____ 260—462
3,135,781  6/1964  Kitasaki et al. _____ 260—462

FOREIGN PATENTS 1,224,181  2/1960  France.
1,251,043  12/1960  France.

CHARLES B. PARKER, *Primary Examiner.*
L. D. ROSDOL, *Examiner.*